United States Patent [19]

Exley

[11] 3,894,553

[45] July 15, 1975

[54] CABLE REEL CONTROL VALVE

[75] Inventor: Vern R. Exley, Franklin, Pa.

[73] Assignee: Joy Manufacturing Company, Pittsburgh, Pa.

[22] Filed: May 20, 1974

[21] Appl. No.: 471,423

Related U.S. Application Data

[63] Continuation of Ser. No. 267,848, June 30, 1972, abandoned.

[52] U.S. Cl. ............................................. 137/102
[51] Int. Cl. ............................................. F15b 15/18
[58] Field of Search .................................. 137/102

[56] References Cited
UNITED STATES PATENTS 2,367,682   1/1945   Kehle ............................. 137/102 X
2,610,859   9/1952   Wilcox ............................. 137/102
2,654,382   10/1953  Ball ................................. 137/102
2,654,383   10/1953  Hopkins ........................... 137/102

Primary Examiner—Robert G. Nilson

[57] ABSTRACT

A control valve assembly for controlling reversible flow between a hydraulic pump and a hydraulic motor utilizing a novel valve arrangement of a combined control spool and check valve in a simplified valve housing.

6 Claims, 3 Drawing Figures

CABLE REEL CONTROL VALVE

This is a continuation of application Ser. No. 267,848, filed June 30, 1972, now abandoned.

BACKGROUND OF THE INVENTION

In hydraulic control systems where fluid flow is reversible to a hydraulic motor the fluid pressure therein must be regulated in both directions of flow. In cable reel mechanisms utilized on mining cars the torque on the cable reel is variable according to whether cable is being wound or unwound, it is therefore necessary to provide means for controlling the pressure of fluid in control lines under the different conditions. Various control valve means have been utilized including a plurality of uni-directional flow valves and multi-directional flow valves using a combination of interconnected control valves, check valves and relief valves usually resulting in a complicated bulky and expensive assembly where a simplified compact valve assembly is desired.

SUMMARY OF INVENTION

According to the present invention there is provided a new and novel valve assembly including a simplified combined spool and check valve means for controlling the flow of fluid under pressure from a pump to a hydraulic motor and return flow from said motor when operated in reverse to function as a pump.

Other provisions of this invention will be more apparent when taken in conjunction with the following more detailed description with the accompanying drawings wherein.

DESCRIPTION

Figure 1:
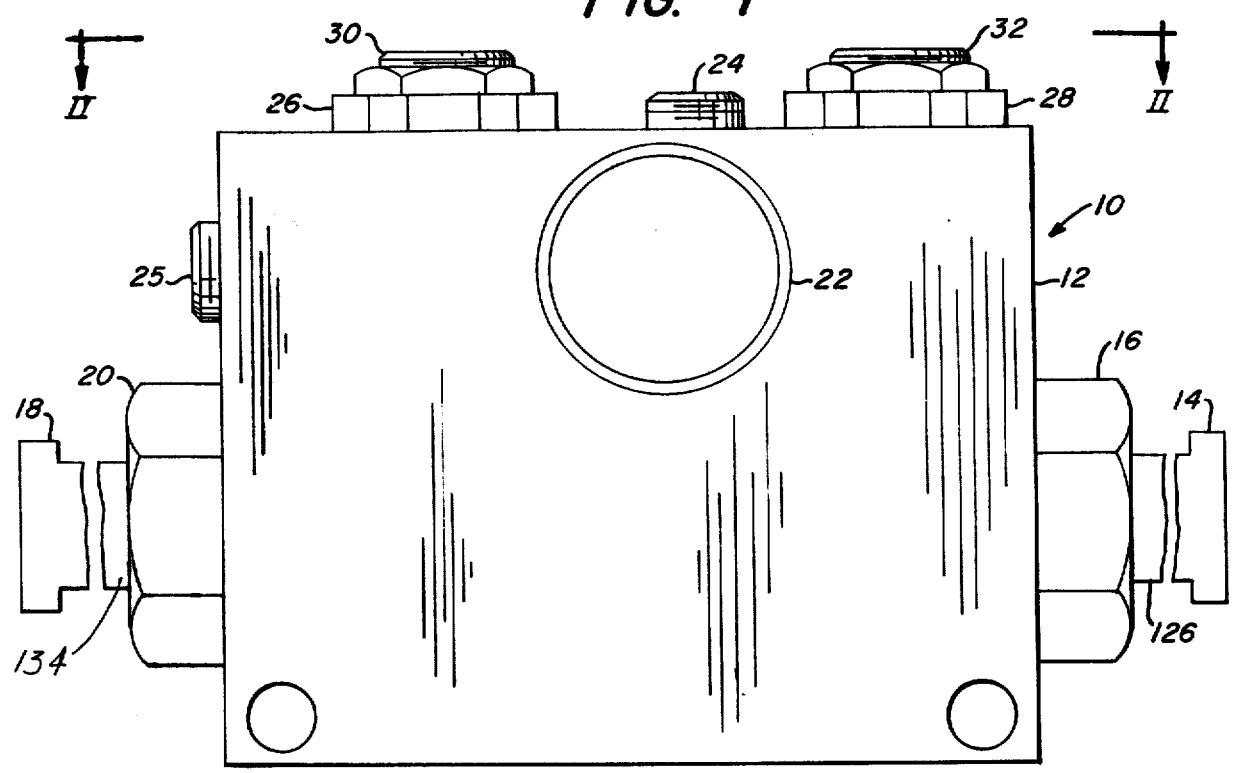
FIG. 1 is a plan view of the control valve.
Figure 2:
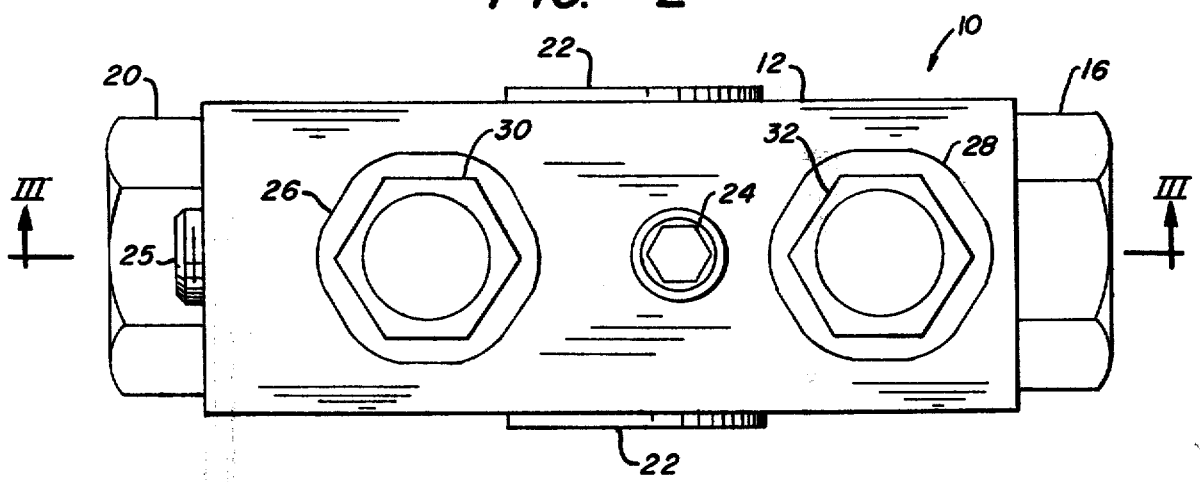
FIG. 2 is an elevational view of the control valve.

Referring to FIGS. 1 and 2 there is shown control valve 10 having a valve body 12 with a pump 14 (shown in FIG. 1 as a box form) connected to a supply hose connector 16, and a well known hydraulic motor as a cable reel motor 18 (shown in FIG. 1 as a box form) connected to a delivery hose connector 20. A side sump connector 22 extends through the sides of the valve body 12 and may be selectively connected on either side thereof to a suitable sump or reservoir (not shown) functioning as a source of fluid for the pump 14. Inspection plugs 24 and 25 provides access to internal sump passages (described hereinafter) if access is necessary. Threaded relief valves having valve bodies 26 and 28 with adjustment caps 30 and 32 are positioned on the top of the valve body 12 to secure respectively a low torque relief valve assembly 34 and a high torque relief valve assembly 36 of a well known type described briefly hereinafter with description of FIG. 3.

Figure 3:
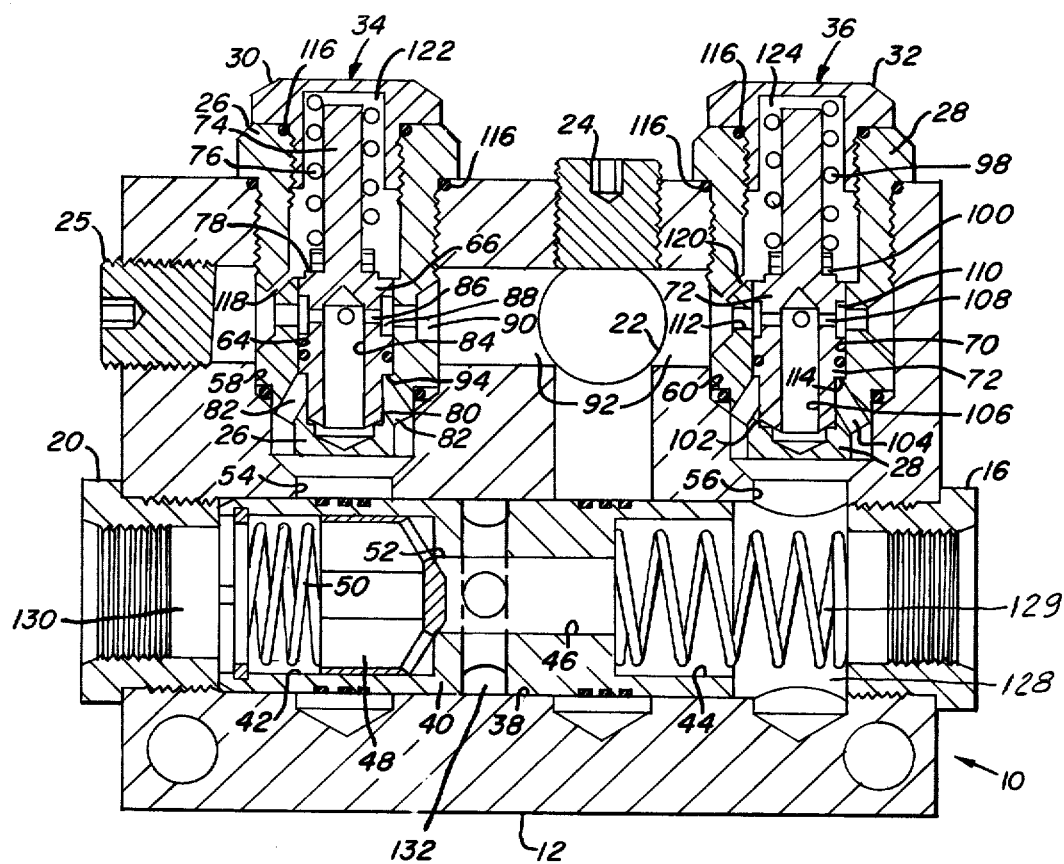
FIG. 3 is a sectional view of the control valve as taken through line III—III of FIG. 2.

Referring to FIG. 3 the lower portion of the valve body 12 has a bore 38 extending therethrough from the supply connector 16 to the delivery connector 20. Slidably contained within said bore 38 is a valve assembly 40. The valve assembly 40 has a central bore passage therethrough comprised of bore chambers 42 and 44 on opposite ends thereof, interconnected by a smaller diameter bore 46. A check valve 48 is positioned within the bore chamber 42 of the valve assembly 40 biased by a spring 50 toward a seating portion 52 of the small bore 46 to regulate flow between the smaller bore 46 and the bore chamber 42 leading to the delivery connector 20.

Radially extending from the bore 38 at opposite ends thereof are respectively located passageways 54 and 56 leading to relief valve chambers 58 and 60. The chambers 58 and 60 house respectively; a low torque relief valve assembly 34 including a relief valve body 26 having a bore 64 therein for receiving a sliding valve member 66; and a high torque relief valve 36 including a relief valve body 28 having a bore 70 therein for receiving a sliding valve member 72.

In the low torque relief valve assembly 34, the sliding valve member 66 has a stem 74 encircled by a spring 76 adjustably biased between the adjustment cap 30 and a shoulder 78 on the valve member 66 to bias the valve member 66 downward (as viewed in FIG. 3) to seat on a seating portion 80 on the valve body 26. The seating and unseating of the valve member 66 on the seating portion 80 regulates the flow of fluid from the passageway 54 around the end of the valve body 26 via ports 82, through the seating portion 80 when the valve member 66 is unseated, through a center bore 84 in the valve member 66 through radial ports 86 and a radial port 88 in the valve member 66 to a port 90 in the relief valve body 26, to sump passages 92 in the control valve body 12 and thence via sump connection 22 to a sump (not shown) to be recirculated as explained hereinafter. The pressure of the fluid in ports 82 acting on a shoulder 94 encircling the valve member 66, is in opposition to the biasing force of spring 76, which is adjustable by the adjustment of adding or removing spring shims to vary the seating and unseating pressures of the valve member 66.

The high torque relief valve 36 is constructed the same as the low torque relief valve 34 with the sliding valve stem 96, encircled by spring 98 adjustable biased between cap 32 and a shoulder 100 to bias the valve member 72 downward (as viewed in FIG. 3) to seat on a seating portion 102. When the valve member 72 is unseated, the fluid under pressure from passageway 56 flows around the end of relief valve body 28 through ports 104, past the seating portion 102, through a center bore 106 in the valve member 72, through radial ports 108 and 110 in the valve member 72 to port 112 in the relief valve body 28 and thence to the sump passages 92 to be delivered via sump connection 22 to a sump (not shown) for recirculation. The valve member 72 is unseated by fluid under pressure acting on an encircling shoulder 114 in opposition to the biasing spring 98. Both relief valves 34 and 36 are suitably supplied with O rings and teflon seals 116 where necessary to prevent leaking of fluid between the various components. Ports 118 and 120 in the respective valve bodies 26 and 28 establish communication between the respective spring chambers 122 and 124 to the sump passages 92 to prevent any possible pressure trapped therein.

In operation the pump 14 is run by any suitable drive means to supply fluid under pressure to the supply connector 16 by any suitable conduit means such as a hose 126 (FIG. 1) to the bore 38 (FIG. 3). The fluid under pressure in bore chamber 44 and in a supply chamber 128 at the inlet end of the bore 38, along with the biasing force of a spring 129 contained within said chamber 128 and bore chamber 44, move the valve assembly 40 to the left (as viewed in FIG. 3) until the left end of the valve assembly abuts the delivery connector 20 at the discharge end of the bore 38 (the left end as viewed in FIG. 3). In this left hand position a so-called high torque position just described, the passageway 54 is blocked off from communication with the left end or delivery chamber 130 in bore 38, a vent passage means 132 radially extending from the small connecting bore 46 is blocked off, and the right end supply chamber 128 is connected to the passageway 56 leading to the high torque relief valve 36. Continued supply of fluid under pressure to the supply chamber 128, and in the bore chambers 44 and bore 46 causes the check valve 48 to open to the left against the spring 50 to thereby permit flow of fluid under pressure through the delivery chamber 130 and delivery connector 20 to a conduit means such as a hose 134 and thence to the cable reel motor 18. Supply of fluid under pressure to the cable motor causes the motor 18 to operate in a well known manner to wind on cable or line, in this case electrical mining cable is intended to be wound on as a mining vehicle carrying the cable reel moves toward the lead end of the cable. The supply of fluid under pressure to said motor 18 is continuous such that a high torque effort is constantly available to wind on the cable.

When the winding-on procedure is slowed or stopped by slowing or stopping of the vehicle carrying the cable, an excess pressure is built up in the hose 134, delivery chamber 130, bore 46, and supply chamber 128. The just described excess pressure is relieved by the high torque relief valve 36 wherein the fluid under pressure flows through passageway 56, through ports 104 to the shoulder 114 to act thereon. The pressure acting on the shoulder 114 causes the valve member 72 to move upward against the biasing force of spring 98 to unseat the valve member 72 from the seating portion 102. With the valve member 72 unseated or open, communication is established from the ports 104, through the bore 106 and ports 108, 110 and 112 to the sump passages 92 and thence out the sump connection 22 to the sump to thereby relieve the excess pressure until the valve member 72 reseats at a pressure predetermined by the setting of the adjustment against the spring 98. It can thus be seen that a steady regulated fluid pressure is maintained in the hose 134 to be available to the cable reel motor 18 to wind-on cable at any speed up to a preset maximum speed of the motor 18. The fluid delivered to the sump is resupplied to the pump 14 for recirculation.

If the vehicle carrying the cable reel is moved away from the lead end of the cable, a paying-out operation of the cable reel motor is effected wherein the direction of rotation of the motor is reversed by the trailing cable being pulled off of the reel. This reversal of the motor 18 causes the motor to act as a pump and further increases the pressure of fluid in the hose 134 and the delivery chamber 130. This increase of pressure in delivery chamber 130 along with the biasing force of spring 50 in bore 42 will first move the check valve 48 to the right to a seated position on the seating portion 52, and secondly will move the valve assembly 40 with the seated check valve 48 to the right to a so-called low torque position against the biasing forces of the spring 129 in the bore 44 and the incoming fluid under pressure from the pump 14. This movement to the right is limited by the valve spool 40 contacting the supply connector 16 in a so-called low torque position. In the low torque position the communication between passageway 56 and the supply chamber 128 is interrupted by the valve assembly 40, while communication is established between the supply chamber 128, bore chamber 44, bore 46 and radial vent passage means 132 to the sump passages 92 and then to the sump to provide a recirculating flow for the fluid from the pump 14. Simultaneously, communication is established between the delivery chamber 130 and the low torque relief valve 34 at the passageway 54 and ports 82 to permit fluid under pressure therein to act on the shoulder 94 to unseat the valve member 66 from the seating portion 80 and permit flow of fluid under pressure past said seating portion 80 to bore 84, ports 86, 88 and 90 to the sump passages 92 and thence to the sump for recirculation. It can thus be seen that a low pressure is maintained in the delivery chamber 130 and hose 134 while the cable reel is "paying out" trailing cable to thereby prevent the cable reel motor 18 from over-running or free-wheeling which would result in undesired slack in the trailing cable.

When the described paying out of trailing cable is stopped and a reeling-in is desired, the pumping action of the cable reel motor 18 stops which immediately stops the pressure in the hose 134, delivery chamber 130, and the described supply to the low torque relief valve 34, and change from pump action to motor action effects a rapid reduction of fluid pressure therein to reseat the valve member 66 to stop the venting of fluid under pressure therethrough and permits the inlet pump pressure in supply chamber 128 along with the spring 129 to return the valve assembly 40 to its described left hand or high torque position and again open the check valve 48 to effect resupply of fluid under pressure to the delivery chamber 130, hose 134 and cable reel motor 18 to operate the motor 18 as previously described as a motor for reeling in a trailing cable.

It can thus be seen that the described control valve assembly is simplified with a minimum of moving parts enclosed in a compact valve housing which is readily accessible for necessary conduit connections and pressure adjustments.

Although I have shown and described only one embodiment of the present invention, different embodiments may be comprised of variations of port locations and specific valve component structures on locations etc. without departing from the spirit and scope of the invention and it is intended that all matter contained in the foregoing description and shown in the accompanying drawings shall be interpreted as illustrative and not in a limiting sense.

What is claimed is:

1. A control valve comprising: a valve body; a bore in said valve body having one end portion thereof adapted to communicate with a hydraulic supply pump and having an opposite end portion thereof adapted to communicate with a hydraulic pump-motor; first fluid passage means adapted to communicate said one end portion with a sump; second fluid passage means adapted to communicate said opposite end portion with such a sump; a valve assembly slidingly and sealingly received within said bore and operative in a first position to block communication between said opposite end portion and said second passage means and in a second position to block communication between said one end portion and said first passage means; first normally closed relief valve means in said first passage means and operative to open when a first predetermined pressure exists in said one end portion and said valve assembly is in said first position; second normally closed relief valve means in said second passage means and operative to open when a second predetermined pressure, less than said first predetermined pressure, exists in said opposite end portion and said valve assembly is in said second position; said valve assembly having a passageway therethrough and a check valve operative to allow fluid flow through said passageway only in the direction from said one end portion to said opposite end portion; and pressure venting means for communicating said passageway with such a sump only when said valve assembly is in said second position.

2. A control valve as specified in claim 1 wherein said valve assembly has a central longitudinal passage therethrough and said check valve is operatively mounted within said central passage.

3. Control valve as specified in claim 2 wherein said check valve is operably positioned by axial movement thereof relative to the movement of the valve assembly.

4. A control valve as specified in claim 3 wherein said check valve is responsive to biasing forces in one direction from an unseated to a seated position by first spring means acting in opposition to fluid pressure forces at said one end of said bore.

5. A control valve as specified in claim 4 wherein said valve assembly is biased toward said first position by second spring means acting concurrently with fluid pressure forces at said one end of said bore in opposition to fluid pressure forces at said opposite end of said bore.

6. A control valve as specified in claim 1 wherein said first and second fluid passage means are within said valve body.

* * * * *